Patented Apr. 4, 1944

2,345,629

UNITED STATES PATENT OFFICE 2,345,629

EMBOSSING CRYSTALLINE POLYMERIC MATERIAL

John H. Reilly, Midland, Mich., assignor to The Dow Chemical Company, Midland, Mich., a corporation of Michigan No Drawing. Application December 6, 1940, Serial No. 368,904

3 Claims. (Cl. 18—56)

This invention relates to procedure for fabricating crystalline polymers and, more particularly, to a method of embossing or enstamping a surface of articles formed from such materials.

By the term "crystalline polymer," as used in the present specification and claims, is meant those solid products, whether polymers, co-polymers, inter-polymers, or otherwise named which normally exhibit characteristic X-ray diffraction patterns and which may be obtained by polymerizing, separately or in combination, substances containing an ethylenic double bond such, for example, as monomeric vinylidene chloride or ethylene, and by polymerizing together monomeric vinylidene chloride, ethylene or other similar monomers in major proportion with one or more other polymerizable materials such as vinyl chloride, vinyl acetate, styrene, the esters of acrylic or methacrylic acid, allyl and related esters of carboxylic or inorganic acids, unsaturated ethers, etc.

By the term "fused mass," as used in the present specification and claims, is meant a normally crystalline polymeric mass from which substantially all crystallinity has disappeared, as evidenced by the disappearance of its characteristic X-ray diffraction pattern. This condition is produced by heating the crystalline polymer to a temperature generally at least about 15 centigrade degrees above the softening point.

In United States Letters Patent 2,183,602 it is disclosed that polymeric vinylidene chloride and co-polymers thereof which contain vinylidene chloride as the major component can advantageously be cold-worked without the application of high pressures by preheating a body of the polymer or co-polymer to a temperature somewhat above the softening point thereof, followed by rapid chilling and subsequent plastic deformation. This invention is in part concerned with the utilization of the advantages inuring to the patented process in those instances where it is sought to produce a desired surface ornamentation or profile of the finished article. It has been found that finished articles produced according to the patented process cannot be embossed or enstamped while the article is still in the super-cooled condition, to produce a clean, lasting impression of the die contours, since the flow characteristics of the article in the super-cooled condition are too high. And if the article is allowed to pass beyond the super-cooled stage, i. e., to crystallize or "set," then it is extremely difficult to produce a good impression from a die without the use of such high pressure that the article may be deformed as to its general shape.

A procedure has now been worked out whereby clean, sharp ornamentation can be produced on the surface of super-cooled articles of crystalline co-polymers which avoids the necessity of using pressures such that undesired deformation of the otherwise finished article might occur. To this end, I have found that such result can be obtained by heating the die or stamp to a temperature above about 50° C. before it is contacted with the surface to be impressed. The die or stamp should not, of course, be so hot that it decomposes or tends to initiate decomposition of the article, and is preferably below the softening point of the polymer. In general, temperatures between 50° C. and the softening point of the polymer are most practical, depending upon the composition of the material being impressed and the length of time the die is in contact with the article. Very low pressures, e. g., as low as 5 pounds per square inch, can be used to produce clean relief replicas of the die.

The application of a heated die or stamp to the surface of a super-cooled body or article of crystalline polymers causes the super-cooled body to harden almost instantly after the die has been applied thereto. After the die is withdrawn from contact with the article, there is no tendency of the material to flow and the boss retains its shape perfectly. This is contrasted with bosses, produced on a surface of said super-cooled material with dies at or slightly above room temperature, which may flow before the main body of the article has crystallized or "set."

In carrying out the invention, a crystalline polymer obtained, for example, by polymerizing together a mixture of 85 per cent vinylidene chloride with 10 per cent of vinyl acetate and 5 per cent of 2-chloro-ethyl vinyl ether, in the presence of a peroxide and a metal carbonyl, may be heated to a temperature of about 200° C. by immersion in a hot liquid. The heated co-polymer is then plunged directly into ice water or other cold liquid, and thereafter compression molded at a pressure of about 750 pounds per square inch to form a desired object. Before the object changes from the super-cooled state to the crystalline state, which may occur in a few minutes or several days, depending upon the temperature at which it is held after molding, it can be enstamped to produce a trademark or desired ornamental design, by impressing at a relatively low pressure, e. g., from 5 to 25 pounds per square inch, a die which has been heated to a temperature of 75° to 125° C.

It is not essential that the whole article be supercooled prior to embossing or enstamping in order to carry out the procedure, and it is not essential that the embossing be performed immediately after the article has been prepared. Thus, the present method can be used on any fused mass of polymeric vinylidene chloride and its crystalline co-polymers by combining the super-cooling step of the aforesaid patent with the application of a die or stamp heated in the range aforementioned.

A one-eighth inch thick sheet of crystalline polymer composed essentially of 90 per cent vinylidene chloride with 10 per cent vinyl chloride and containing 7 per cent of plasticizer was immersed in a glycerin bath at a temperature of 180° C. for ten seconds, plunged into ice water, and upon the surface thereof a copper half-tone engraving, which was at a temperature of about 100° C., was impressed. This produced a perfect relief replica of the engraving which remained sharp and exhibited no flow. According to this procedure, the super-cooling action was confined to the surface layer of the sheet and the sheet held its shape well so that it could be handled while the actual crystallization produced by the hot stamping tool of the embossed surface was confined to the area of the boss.

While the present process has been particularly described with reference to a method of fabricating a vinylidene chloride-vinyl chloride crystalline polymer and a vinylidene chloride-vinyl acetate-2-chloro-ethyl vinyl ether crystalline polymer, it will be obvious to those skilled in the art that it is not limited in scope thereto. Thus, the invention may be carried out in a similar manner and with like results while operating on the co-polymers of vinylidene chloride or other vinylidene halides and such co-polymerisable, unsaturated compounds as vinyl acetate, styrene, vinyl cyanide, methyl methacrylate, ethyl acrylate, di-allyl oxalate, chloro-allyl-chloro-acetate and the like, so long as the proportion of vinylidene halide and co-polymer compounds are such as to conform to the definition of crystalline polymers. The incorporation of minor amounts of plasticizers, coloring agents, fillers, heat-stabilizing agents and the like has also been found to be useful and desirable when used in such amounts that the crystallinity of the polymer is not affected.

I claim:

1. In a method of embossing the surface of a normally crystalline polymer selected from the group consisting of polymeric vinylidene chloride and normally crystalline copolymers of vinylidene chloride the step which consists in impressing upon a super-cooled body of such polymer an embossing die which is at a temperature above about 50° C. but below the softening point of the polymer for a period of time sufficient to cause crystallization of the shaped, superficial portion of the polymer body.

2. In a method of embossing the surface of a normally crystalline polymer selected from the group consisting of polymeric vinylidene chloride and normally crystalline copolymers of vinylidene chloride the step which consists in impressing upon a super-cooled body of such polymer an embossing die which is at a temperature between about 50° C. and about 125° C. for a period of time sufficient to cause crystallization of the shaped, superficial portion of the polymer body.

3. In a method of embossing the surface of a normally crystalline polymer selected from the group consisting of polymeric vinylidene chloride and normally crystalline copolymers of vinylidene chloride the step which consists in impressing upon a super-cooled body of such polymer an embossing die which is at a temperature between about 75° C. and about 125° C. for a period of time sufficient to cause crystallization of the shaped, superficial portion of the polymer body.

JOHN H. REILLY.